US010503671B2

(12) United States Patent
Hobson et al.

(10) Patent No.: US 10,503,671 B2
(45) Date of Patent: Dec. 10, 2019

(54) CONTROLLING ACCESS TO A SHARED RESOURCE

(71) Applicant: Yahoo Holdings, Inc., Sunnyvale, CA (US)

(72) Inventors: Jay Hobson, Fremont, CA (US); Derek Wang, San Jose, CA (US)

(73) Assignee: Oath Inc., New York, NY (US)

( * ) Notice: Subject to any disclaimer, the term of this patent is extended or adjusted under 35 U.S.C. 154(b) by 227 days.

(21) Appl. No.: 15/393,856

(22) Filed: Dec. 29, 2016

(65) Prior Publication Data

US 2018/0191706 A1    Jul. 5, 2018

(51) Int. Cl.
*G06F 13/16*    (2006.01)
*G06F 9/50*    (2006.01)
*G06F 21/62*    (2013.01)
*G06F 21/60*    (2013.01)

(52) U.S. Cl.
CPC ................................ *G06F 13/1663* (2013.01)

(58) Field of Classification Search
None
See application file for complete search history.

(56) References Cited

U.S. PATENT DOCUMENTS

| 5,963,963 | A  | * | 10/1999 | Schmuck | G06F 9/5016 |
| 6,199,127 | B1 | * | 3/2001 | Ajanovic | G06F 13/1605 |
| | | | | | 710/100 |
| 8,473,880 | B1 | * | 6/2013 | Bennett | G06F 17/505 |
| | | | | | 716/104 |
| 2002/0078270 | A1 | * | 6/2002 | Hofstee | G06F 13/28 |
| | | | | | 710/23 |
| 2004/0181636 | A1 | * | 9/2004 | Martin | G06F 12/0815 |
| | | | | | 711/152 |

* cited by examiner

*Primary Examiner* — Michael Alsip
(74) *Attorney, Agent, or Firm* — Pillsbury Winthrop Shaw Pittman LLP

(57) ABSTRACT

The present teaching, which includes methods, systems and computer-readable media, relates to controlling access to a shared resource including, for example, a memory unit. The disclosed techniques may include receiving a configuration parameter relating to a relationship between read and write requests that are initiated by concurrent processes and stored in read and write queues, respectively, for accessing the shared resource. The techniques may further include determining, based on the configuration parameter, whether to allow a read request or a write request to be executed using the shared resource, and providing to a concurrent process access to the shared resource for executing the allowed read or write request. Further, upon a completion of executing the allowed read or write request, a return token on a return token queue different from the read and write queues may be received, the return token corresponding to the allowed read or write request.

18 Claims, 12 Drawing Sheets

CONTROLLING ACCESS TO A SHARED RESOURCE

BACKGROUND

1. Technical Field

The present teaching relates to controlling access to a shared resource, for example, a memory or a storage unit, and more specifically, to controlling access to a shared resource based on a configuration parameter that relates to a relationship between read and write requests to access the shared resource.

2. Technical Background

A shared resource may be accessible to a plurality of processes or applications being executed on a computing device. For example, a shared memory may be accessible to both a word processing application and a web browser application being executed on a computing device. If multiple applications and/or processes, for example, desire to access a common file and/or other resource stored in a common memory at the same time, certain restrictions may be undertaken so that one of the applications and/or processes, for example, may modify the common file and/or other resource at a given time. For example, an application or process may lock a file or other resource (e.g., make it inaccessible to other applications and/or processes) before modifying the file and/or resource.

A lock in this context may comprise a synchronization mechanism to enforce limits on access to a shared resource in an environment where there are multiple threads, applications and/or processes executing and capable of gaining access to the resource. However, traditional locking techniques in the context of multi-thread/multi-process systems are very specific to the computing environment for which they are designed. For example, traditional locking techniques may not allow to dynamically change a preference of executing certain type of requests (read or write requests) using the shared resource over other types of requests, or change a pre-established relationship in execution of different request types, based on certain system conditions. That is, it may not be possible to realize the flexibility of making such changes based on dynamic system conditions without significant reprogramming or reconfiguration of the technique(s) used to control access to the shared resource.

Therefore, there is a need to provide an improved solution for controlling access to a shared resource for executing different types of concurrent requests using the shared resource and solve other problems mentioned above.

SUMMARY

The teachings disclosed herein relate to methods, systems, and programming for controlling access to a shared resource, for example, a memory or a storage unit. In particular, the present teachings are directed to controlling access to a shared resource based on a configuration parameter that relates to a relationship between read and write requests to access the shared resource and that may be dynamically updated based on certain computing process-related conditions.

In one example, a method, implemented on a machine having at least one processor and storage, of controlling access to a shared resource comprising a memory unit is disclosed. The method may include receiving a configuration parameter relating to a relationship between read and write requests that are initiated by concurrent processes and stored in read and write queues, respectively, for accessing the shared resource. The techniques may further include determining, based on the configuration parameter, whether to allow a read request or a write request to be executed using the shared resource, and providing to a concurrent process access to the shared resource for executing the allowed read or write request. Further, upon a completion of executing the allowed read or write request, a return token on a return token queue different from the read and write queues may be received, the return token corresponding to the allowed read or write request.

In another example, a system for controlling access to a shared resource is disclosed. The system may include a processing unit, a shared resource, a configuration processor, a read module, a write module, and a return token module. The processing unit may be configured to support concurrent processes executing concurrently in the system. The shared resource may include a memory unit and may be used to execute read and write requests that are initiated by the concurrent processes and stored in a read queue and a write queue, respectively, for accessing the shared resource. The configuration processor may be configured to receive a configuration parameter relating to a relationship between the read and write requests, and determine, based on the configuration parameter, whether to allow a read request or a write request to be executed using the shared resource. The read module may be configured to provide, in response to said determining by the configuration processor, access to the shared resource by a concurrent process to execute an allowed read request. The write module may be configured to provide, in response to said determining by the configuration processor, access to the shared resource by a concurrent process to execute an allowed write request. The return token module may be configured to receive, upon completion of the execution of the allowed read or write request, a return token on a return token queue that is different from the read and write queues, the return token corresponding to the allowed read or write request.

Other concepts relate to software to implement the present teachings on controlling access to a shared resource. A software product, in accord with this concept, includes at least one machine-readable non-transitory medium and information carried by the medium. The information carried by the medium may be executable program code data, and/or parameters in association with the executable program code, etc.

In one example, a machine-readable, non-transitory and tangible medium having data recorded thereon for controlling access to a shared resource comprising a memory unit, where the information, when read by the machine, causes the machine to perform a plurality of operations. Such operations may include receiving a configuration parameter relating to a relationship between read and write requests that are initiated by concurrent processes and stored in read and write queues, respectively, for accessing the shared resource. The techniques may further include determining, based on the configuration parameter, whether to allow a read request or a write request to be executed using the shared resource, and providing to a concurrent process access to the shared resource for executing the allowed read or write request. Further, upon a completion of executing the allowed read or write request, a return token on a return token queue different from the read and write queues may be received, the return token corresponding to the allowed read or write request.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, and other implementations directed to controlling access to a shared resource, for example, a memory or a storage unit. In particular, the present teachings are directed to controlling access to a shared resource based on a configuration parameter that relates to a relationship between read and write requests that are initiated by concurrent processes/threads/applications in a computing system and are stored in read and write queues, respectively, for accessing the shared resource. The configuration parameter may be dynamically changed or updated based on certain conditions related to the concurrent processes and/or conditions related to the computing system or environment in which the concurrent processes are being executed. For example, the configuration parameter may be dynamically changed based on certain current system conditions from a "read-heavy" environment in which more read requests than write requests are being executed using the shared resource to a "write-heavy" environment in which more write requests than read requests will be executed using the shared resource. Other changes affecting the relationship of execution of read and write requests using the shared resource may be realized by dynamically changing the configuration parameter, instead of reprogramming the core technique or mechanism (e.g., mutual-exclusion lock or semaphore) used to access and/or lock the shared resource. The terms "processes," "threads," "applications," and "tasks" may be used interchangeably herein.

Figure 1:
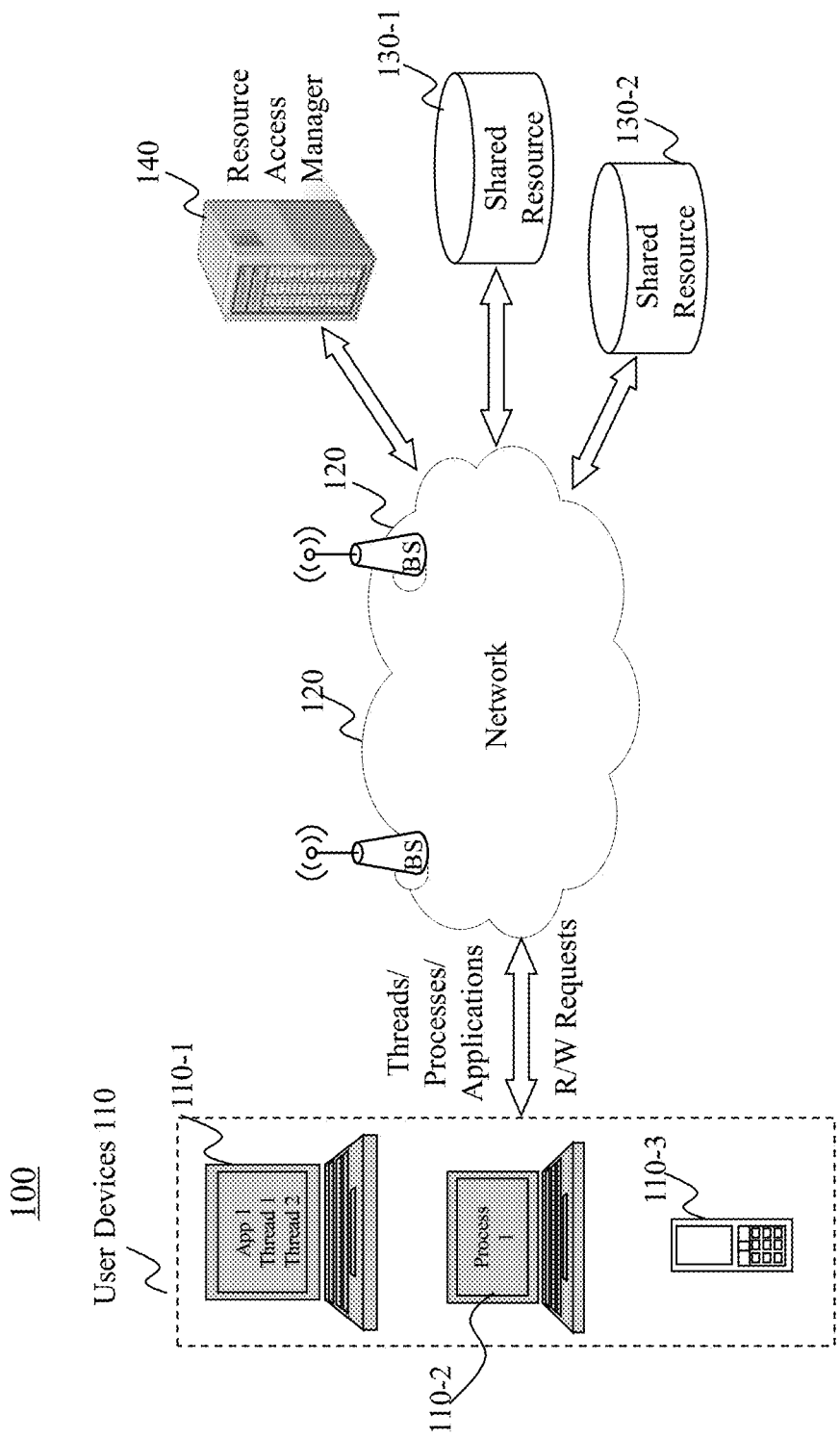
FIG. 1 illustrates an example of a system in which mechanisms to control access to a shared resource is implemented, in accordance with various embodiments of the present disclosure.

FIG. 1 illustrates a broad schematic 100 illustrating an exemplary system including user devices (e.g., electronic devices) that are executing one or more applications or processes that access and utilize one or more shared resources. As illustrated, the exemplary system may include user devices 110, a network 120, shared resources 130, and a resource access manager 140. The network 120 may be a single network or a combination of different networks. For example, a network may be a local area network (LAN), a wide area network (WAN), a public network, a private network, a proprietary network, a Public Switched Telephone Network (PSTN), the Internet, a wireless network (e.g., a personal area network, a Bluetooth network, a near-field communication network, etc.), a cellular network (e.g., a CDMA network, an LTE network, a GSM/GPRS network, etc.), a virtual network, or any combination thereof. A network may also include various network access points, e.g., wired or wireless access points such as base stations or Internet exchange points through which a data source may connect to the network in order to transmit information via the network.

User devices 110 (interchangeably referred to herein as users 110) may be electronic devices, such as desktop computers 110-2, laptop computers 110-4, a mobile device 110-6, servers and/or other computing devices, that are configured to store, support and execute one or more software and hardware applications thereon. The applications, processes or tasks on a device 110 may be running or executing concurrently (using a common processor of the device 110) and may intend to access and use a same shared resource (or a portion thereof) at a same time or within a same time window. In one embodiment, devices 110 may be connected to the network 120 and able to interact with the shared resources 130 and the resource access manager 140 through wired or wireless technologies and related operating systems implemented within user-wearable devices (e.g., glasses, wrist watch, etc.).

The shared resource 130 refers to a resource capable of being accessed by more than one process, application and/or thread, such as if the more than one processes, applications and/or threads are executing concurrently, for example, on a device 110. A shared resource may comprise any computing device, networking device, storage device, memory device and/or service, for example. Examples may include shared memory units, printers, shared storage, etc. In this context, the term resource, which may, for example, include memory, peripherals, etc, is understood to refer to a shared resource. Similarly, although a thread, a process or an application may carry different technical attributes or understanding, for these purposes, they are considered sufficiently similar to/referred to generically as execution of a task, such as with respect to a shared resource. Therefore, for convenience, the term task, such as in connection with execution a task, for example, may refer to any of a thread, a process, an application or any combinations therefore, including concurrent execution. Thus, it may also include multiple processes, applications and/or threads, for example. It is further noted that with advances in technology, it has become more typical to employ distributed computing approaches in which a computational problem may be divided among computing or processing devices, including one or more clients and one or more servers, via a computing and/or communications network. Thus, a shared resource may also be shared via a computing and/or communications network, e.g., the network 120.

With respect to use of a shared resource, a computing system may have multiple applications being executed or run substantially simultaneously and/or concurrently, such as a word processing application and a web browser application. In this example, both applications may seek to access the same file at the same time in a shared memory. In a concurrent executing environment, if both applications seek to access a resource (or portion thereof) at substantially the same time or concurrently, such as, for example, to change or write to the resource, it is desirable for one of the applications to be permitted access the resource at a given time to reduce potential for error or conflict from concurrent execution. A lock mechanism may be utilized so that two or more applications, for example, are not able to gain access to the resource substantially simultaneously or concurrently. A lock mechanism may, therefore, be utilized so that while one of the applications accesses the resource, one or more other applications are able to wait to access the resource, in a particular situation, for example.

In one implementation, a lock mechanism may use a mutual-exclusion lock ("mutex") or a semaphore to keep reader and/or writer tasks from concurrent or substantially simultaneous access (e.g., accessing the same memory location at the same time or virtually the same time). A "lock mechanism" or "lock," as used herein refers to a synchronization mechanism for enforcing limits on access to a resource in an environment where there are or may be multiple tasks of execution capable of accessing the resource. A lock may be designed to enforce a so-called mutual exclusion concurrency control policy. A lock may be utilized, for example, by a Multiplexed Display Buffer Memory (MDBM), typically a hardware component.

A "resource" or "system resource," as used herein may refer to a physical or virtual component of limited availability within a computing or networking system, such as, for example, a computer system. A device, for example, connected to and/or in communication with a computer system may comprise a resource, such as a physical memory or an external peripheral, as examples. An internal system component may also comprise a resource, whether physical or virtual. A virtual system resource may, for example, include files, network connections, and/or portions of virtual memory, for example.

A "mutual-exclusion lock" or "mutex," as used herein may refer to a lock utilized to enforce mutual exclusion so that one task, for example, has access to a resource at a particular time. As previously indicated, use of the term task is intended, of course, to encompass threads, processes and/or applications. For example, if a thread attempts to lock a resource via a mutex, the mutex may either "be acquired" by the thread (e.g., if no other thread presently has control of the mutex) or the requesting thread may be "put to sleep" until the lock is available again (e.g., in case another thread presently has control of the mutex). If there are multiple threads waiting to control a single mutex, an order in which they are "awoken" may be random or at least not specified in some embodiments.

A "semaphore," as used herein may refer another approach to manage access to a resource by multiple tasks and, therefore, may be considered to be a lock or lock-type mechanism; however, typically, a semaphore includes code to manage and/or control access by multiple tasks to a resource, such as in a parallel programming or a multi-user environment, for example. A semaphore may be thought of as an operational record of how many units of a particular resource are available, coupled with operations to safely (e.g., without race conditions) adjust that record as units become available, and delay until a unit of the resource becomes available, if none are available currently. A semaphore may allow a pre-set number of tasks (e.g., threads) to access a particular resource, for example, if multiple resources or multiple units of a resource are available. An example might comprise a group of N printers, where N is a whole number.

A "race condition" or "race hazard," as used herein may refer to behavior in which an output signal, for example, may be dependent, at least partially, on a particular sequence and/or particular timing of occurrence of a set of events. Thus, if events do not occur in an order envisioned, such as by a programmer or other system designer, undesirable and/or unexpected results may take place. A "race condition" typically refers to a situation in which two or more signals "race" to influence another signal, such as, for example, an output signal. Race conditions may occur in electronics systems, logic circuits, or in computer software, such as in multithreaded and/or distributed programs, for example. A semaphore may be employed so that a given situation does not produce a race condition, for example, as explained in more detail below, through appropriate synchronization. Semaphores which allow a resource count may be referred to as counting semaphores, whereas semaphores which employ the values 0 and 1 (e.g., unlocked/locked or unavailable/available) may be referred to as binary semaphores.

Distinctions exist between a mutex and a semaphore, typically. A mutex may be utilized for locking a single resource. In contrast, a semaphore may offer an ability to handle a multiplicity of similar resources. For example, a mutex may be released by a thread which has acquired control of the mutex, whereas typically any executing thread may signal a semaphore. More precisely, a thread executing a particular task, for example, may take control of a mutex and release control, in that order, so that conflicting operations do not occur with respect a resource "protected" (e.g., managed) by a mutex.

A semaphore, by contrast, may be utilized in an environment where there are multiple equivalent resources. For example, if there are five equivalent printers in communication with a computing system, there may be five equivalent semaphores capable of locking access to a respective printer if an executing task is accessing the printer so that another task, such as a separate thread, is not capable of accessing the printer while the printer is being accessed by the executing task. This approach reduces risk of conflicting operations from separate tasks for a particular resource. For example, a task operative to print may check for a semaphore available with respect to a printer. In this example, a semaphore may be utilized to obtain a lock on a printer until a document has finished printing. The lock may be released after the printing is complete. Thus, in contrast with a mutex, in which a thread, for example, may take control of a mutex and then release control, a thread executing a particular task, for example, in a system utilizing a semaphore, may typically either signal a resource or wait, but not both, in a particular embodiment.

Semaphores may, for example, be more suitable for handling synchronization. For example, a task 1 may signal or increment a particular semaphore if a "power" button on a keyboard of a computing system is pressed. A task 2, if the particular semaphore is signaled, may wake a display device of the computing system. In such a scenario, one task (e.g., task 1) comprises a producer of an event signal, whereas the other task (e.g., task 2) comprises a consumer of the event signal via a particular semaphore.

A "process," as used herein may refer to an instance of a computing process, such as one that is being executed by a processor or other computing device and/or that is capable of being executed by a processor or other computing device, for example. A "thread" or "thread of execution," as used herein, may refer to a sequence of programmed instructions that may be executed and managed independently or are capable of being executed and managed independently, such as by computing device. A computing device, as an example, may include an operating system scheduler capable of performing such tasks. A thread may comprise a smallest allowable sequence of executable instructions in an embodiment, such as executable by a computing device, for example. A thread may comprise a light-weight process.

A light-weight process as used herein may refer to a technique for achieving multitasking. For example, a light-weight process may be executed and/or may be executable to run in a designated resource space, such as on top of a kernel thread and may share its address space and/or other system resources with other light-weight processes. Multiple threads executing in and/or executable in a designated resource space, e.g., managed by a thread library, may be placed on top of one or more light-weight processes to allow multitasking to be performed, which may result in performance benefits. As indicated previously, the term task may be employed generically to refer to one or more threads, processes, applications, or combinations without loss of generality; however, particular context may likewise provide guidance as to particular intended meaning. Nonetheless, it is understood that particular implementations of threads, processes and/or applications, for example, may differ from one operating system to another. In an embodiment, for example, a thread may be executed within or as part of a process. Multiple threads may be executed within or as part of a given process and may share resources, such as memory, whereas, more typically, different processes may not share resources. Thus, typically, threads of a process that are executing and/or executable may share instructions and/or context, e.g., particular shared values in this example that during execution may be referenced.

A lock mechanism may utilize a mutex or semaphore so that writer and/or reader tasks do not conflict for a portion of a particular memory space at a particular time during execution, for example. However, typical lock mechanisms may not provide much flexibility in terms of how a particular shared resource is accessed or locked in view of dynamic system conditions. For example, a typical mutex or semaphore lock mechanism may not support making dynamic changes (without re-coding the lock mechanism itself) in how a particular shared memory unit is accessed and locked for read and write operations in accordance with certain system conditions that may prioritize read tasks over write tasks or vice-versa. A typical lock mechanism may be configured and implemented using a software code for a specific computing environment, e.g., supporting a certain fixed ratio or frequency of read requests to write requests to be executed using a shared resource (a memory, for example). However, changing such ratio or frequency may require a significant change in the software code of the lock mechanism, and as such, may not be realized on-the-fly in accordance with current system requirements or conditions.

Typical lock mechanisms may also introduce latency issues. For example, use of semaphores or mutex may also utilize relatively complex instruction coding, which may be a disadvantage. Typically, this may be the case to reduce risk of conflicting operations being executed concurrently for a given resource. In a cloud computing environment, for example, there may be multiple threads which may attempt to access a resource substantially simultaneously or concurrently. Thus, overall processing throughput may be decreased if a semaphore or mutex is utilized to lock a system resource capable of being accessed by multiple threads.

Another potential issue associated with a mutex or semaphore is that these approaches typically operate with a single or common task queue in which different request types, such as read and write requests, are placed waiting to be executed using a shared resource. Further, upon complete of execution of each request, the corresponding application or process may provide a return token to the lock mechanism such that the lock mechanism may allow a next request in the task queue to obtain the lock and access the shared resource. Traditionally, such return token are also placed in the same task queue, likely stuck behind read or write requests, and thus, the lock mechanism may not be able to obtain the return token until requests (or other tokens) ahead in the queue have been executed. Therefore, the single queue implementation introduces delay and decreased efficiency in working with a shared resource.

In various implementations, techniques proposed in the present disclosure, as discussed in detail below, provide for a resource access manager 140 that is configured to allow and manage access to the shared resources 130 by applications or processes of devices 110. The resource access manager 140 may handle multiple read and write requests from concurrent processes to access and use a shared resource 130 (e.g., a memory unit) using a configuration parameter that relates to a relationship between read and write requests. The resource access manager 140 may be configured to change or update the configuration parameters based on current system conditions or certain predetermined system requirements, such that processing or execution of the read and write requests using the shared resource is altered, without requiring rewriting of software code of the lock mechanism.

Figure 2:
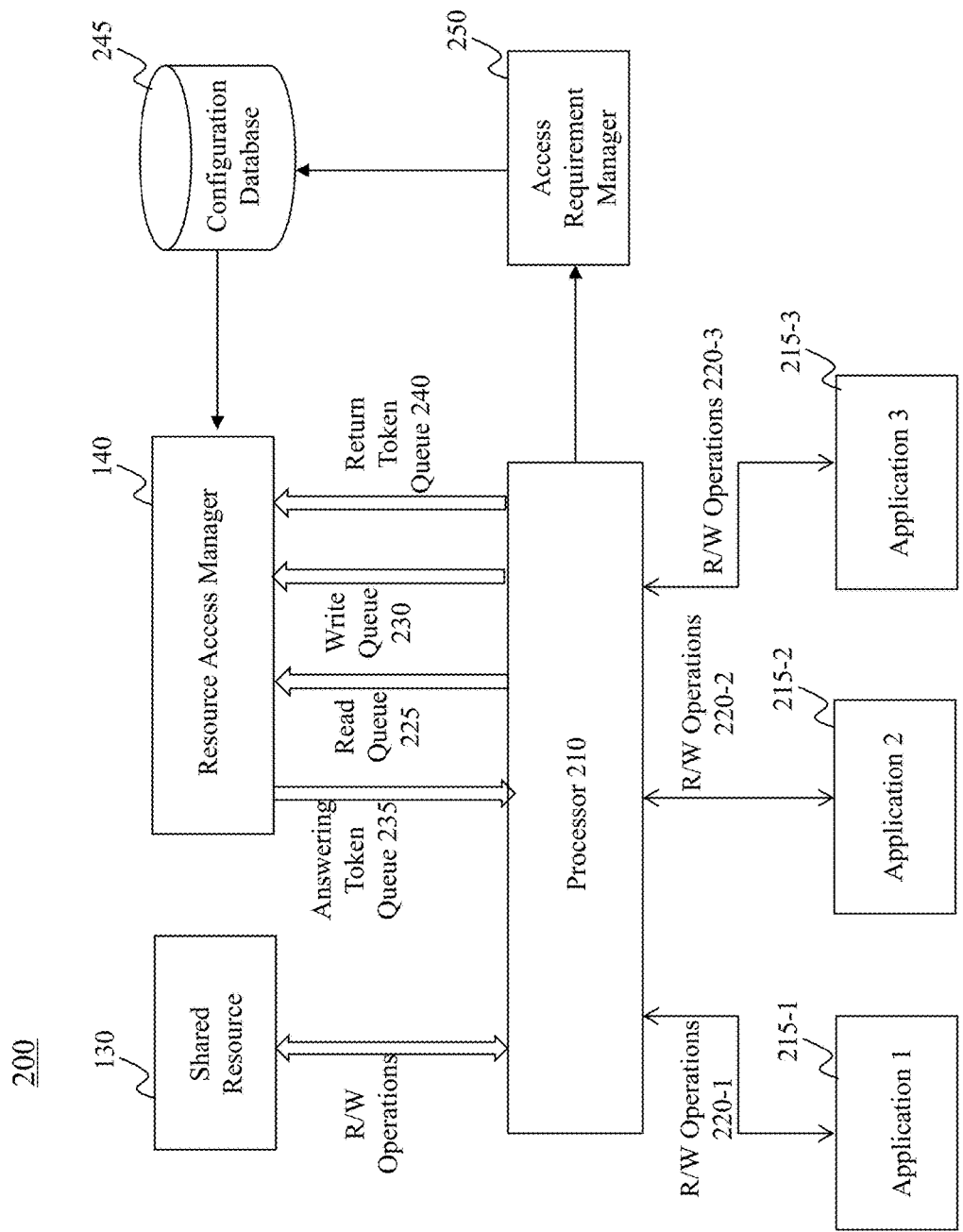
FIG. 2 illustrates an example of another system in which mechanisms to control access to a shared resource is implemented, in accordance with various embodiments of the present disclosure.

FIG. 2 is a high level depiction of an exemplary system 200 in which access management techniques to access a shared resource may be implemented according to the present disclosure. The exemplary system 200 in this embodiment is similar to the exemplary system 100 in FIG. 1, with additional components (various queues, processor, access requirement manager, configuration database, etc.) shown therein. In particular, FIG. 2 illustrates device 110, shared resource 130 and resource access manager 140 as shown in FIG. 1 and discussed above. Further, FIG. 2 illustrates that device 110 may include a processor or processing unit 210 (e.g., a microprocessor including hardware and software) configured to support and execute applications or processes 215-1, 215-2, 215-3 executing concurrently in device 110. Applications 215 may be software applications stored in a storage unit or memory (not shown) of device 110, and may be executed using one or more hardware components (including processor 210) of device 110. As part of their execution, applications 215 each may generate read requests to access at least a portion of shared resource 130 and read or retrieve data stored therein (e.g., without altering the stored data). Similarly, as part of their execution, applications 215 each may generate write requests to access at least a portion of shared resource 130 and add to or update the data stored therein with new data. Although applications 215 are shown as part of the same device 110, these applications may be part of and executing on different devices 110.

Processor 210 may receive read or write requests 220-1, 220-2, 220-3 from applications 215-1, 215-2, 215-3, respectively, identify the type of requests (i.e., whether they are read requests or write requests), and place the read requests in a read queue 225 and place the write requests in a write queue 230. Processor 210 may place the read/write requests serially in read queue 225 and write queue 230 such that, in each queue, an earlier-placed request in the queue is processed by resource access manager 140 and executed using shared resource 130 before a later-placed request in the queue. Although FIG. 2 illustrates queues 225, 230 as being between processor 210 and resource access manager 140, similar queues may also be implemented between processor 210 and shared resource 130, and/or between resource access manager 140 and shared resource 130.

Further, resource access manager 140 processes read requests on read queue 225 and write requests on write queue 230, and, e.g., based on a configuration parameter, allow execution of a read or write request using the shared resource 130 by issuing an answering token (or an access token) for the application 215 corresponding to the allowed read or write request. The answering token may be placed on an answering token queue 235 shown in FIG. 2. Once the execution of the allowed read or write request is completed, the application may return the answering token to resource access manager 140 on a return token queue 240. The returned answering token is referred to herein as the "return token." Upon receipt of the return token, resource access manager 140 may continue issuing answering token for any further read or write requests in their respective queues. The number of answering tokens that resource access manager 140 may issue to one or more applications 215 at any given time depends on the type of lock mechanism (e.g., mutex, semaphore, etc.) implemented in the system. Typically, there is a single common queue for both read and write requests (and for answering and return tokens). However, in accordance with various embodiments of the present disclosure, as shown in FIG. 2, read queue 225, write queue 230, answering token queue 235, and return token queue 240 may be separate, different and/or distinct from each other. In some implementations, read/write requests may be sent along with answering tokens and returning tokens when the action is complete. Further, in some implementations, Go programming language like channels (or sockets) are used as the queuing mechanism for the read/write and token transmission between processes and/or threads.

In this exemplary system 200, configuration database 245 may store configuration files including configuration parameters that relate to or define a relationship between executions of read requests (in read queue 225) and write requests (in write queue 230) using shared resource 130. The configuration files each may include a specific scheme defining how read and write requests are to be handled in terms of accessing shared resource 130 for execution. The resource access manager 140 may obtain one or more configuration files from database 245 to determine the manner in which read and write requests in their respective queues are to be processed.

For example, a configuration file may include a scheme defining that a specific count, say N (where N is an integer), of read requests are to be executed before a write request is executed, or a specific count N of write requests to be executed before a read request is executed. Such a configuration file may be referred to as a "count-based" configuration file, and here the count N is the configuration parameter that may be altered or updated based on certain system conditions or predetermined requirements.

Further, for example, another configuration file in database 245 may include a scheme defining a specific time period, say N seconds (where N is an integer), during which only read requests are executed and write requests are blocked, or a specific time period of N seconds during which only write requests are executed and read requests are blocked. Such a configuration file may be referred to as a "time-based" configuration file, and here the time period N is the configuration parameter that may be altered or updated based on certain system conditions or predetermined requirements. In another example, a configuration file may provide if and when a high priority queue may be established to handle read and/or write requests from one or more specific applications 215. Further, a configuration file may include a configuration parameter indicating a specific number of read requests or write requests that are simultaneously executed by concurrently accessing different portions of the shared resource.

Still referring to FIG. 2, an access requirement manager 250 may be configured to receive, obtain and process system conditions and predetermined system requirements (of system 100/200), and based on that, generate new configuration schemes and parameters for new configuration files. Further, access requirement manager 250 may also be configured to obtain existing configuration files from database 245 and update the value of the configuration parameter (e.g., count N, time period N seconds, etc.) in the obtained files according to the system conditions and/or requirements. Upon generation of new configuration files or completion of the update of the existing configuration files, access requirement manager 250 may send to and store the files in configuration database 245.

Figure 3:
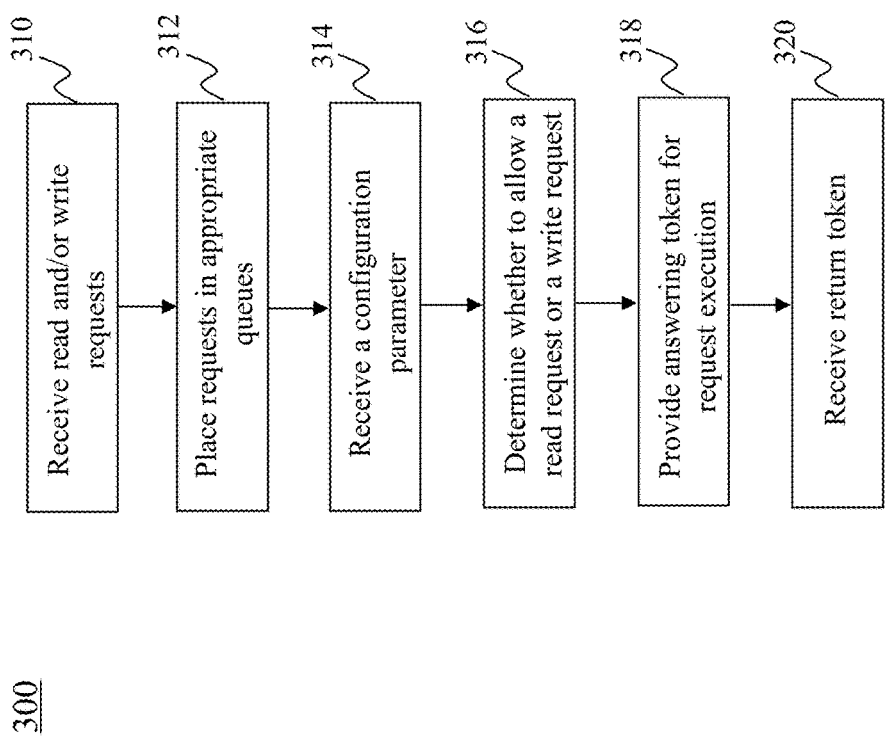
FIG. 3 is a flowchart of an exemplary process operated at system of FIG. 2, in accordance with various embodiments of the present disclosure.

FIG. 3 is a flowchart of an exemplary process 300 operated at system 200, e.g., based on functionalities of various components of system 200 discussed above. In some implementations, at 310, read and write requests are received from concurrent applications 215 at processor 210, and at 312, placed in read queue 225 and write queue 230, respectively. At 314, resource access manager 140 processes read requests on read queue 225 and write requests on write queue 230, and receives a configuration parameter from configuration database 245, for example. At 316, resource access manager 140 determines, based at least on the configuration parameter, whether to allow execution of a read or write request using the shared resource 130. At 318, an answering token (or an access token) is issued for the application 215 corresponding to the allowed read or write request. At 320, once the execution of the allowed read or write request is completed, the application may return the answering token or provide the return token to resource access manager 140 on a return token queue 240.

Figure 4:
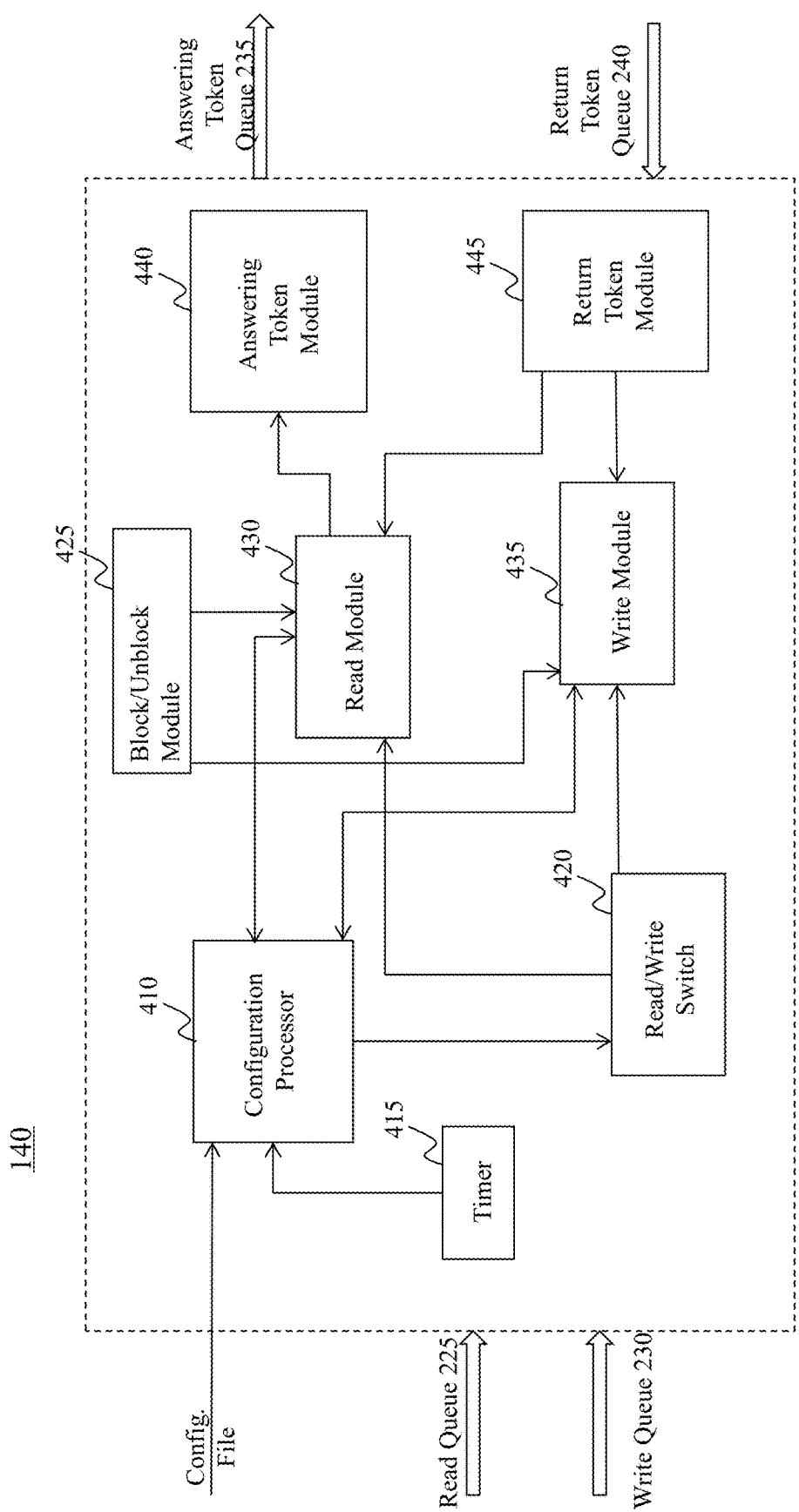
FIG. 4 illustrates a high level depiction of an exemplary resource access manager, in accordance with various embodiments of the present disclosure.

FIG. 4 illustrates a high level depiction of an exemplary resource access manager 140, according to an embodiment of the present disclosure. As shown, resource access manager 140 may include a configuration processor 410, a timer 415, a read/write switch 420, a block/unblock module 425, a read module 430, a write module 435, an answering token module 440, a return token module 445 and/or other components (not shown). In some implementations, read module 430 may be configured to manage read queue 225 in terms of keeping track of how many read requests have been executed since the start of execution of a configuration file at resource access manager 140, and keep a count of how many read requests are waiting in read queue 225. Further, to keep track of how many read requests have already been executed, read module 430 may receive and process a signal or indication received from return token module 445 when a return token related to a completed read requested is received at return token module 445 from a corresponding application 215.

Read module 430 may provide the information related to already executed read requests as well as read requests waiting in queue to configuration processor 410, which may determine whether to next allow a read or write request for execution using the shared resource based in part on the information from read module 430. In response to a signal from configuration processor 410 to next allow a read request to be executed, read module 430 may provide a signal to answering token module 440 to issue an answering token for a corresponding application 215 to execute the allowed read request in read queue 225 using shared resource 130. Further, based on signals received from read/write switch 420 and/or block/unblock module 425, read module 430 may be configured to block read queue 225 such that no read requests are allowed to be executed until another signal from read/write switch 420 and/or block/unblock module 425 is received to unblock read queue 225.

In some implementations, write module 435 may be configured to manage write queue 230 in terms of keeping track of how many write requests have been executed since the start of execution of a configuration file at resource access manager 140, and keep a count of how many write requests are waiting in write queue 230. Further, to keep track of how many write requests have already been executed, write module 435 may receive and process on a signal or indication received from return token module 445 when a return token related to a completed write requested is received at return token module 445 from a corresponding application 215.

Write module 435 may provide the information related to already executed write requests as well as write requests waiting in queue to configuration processor 410. Configuration processor 410 may determine whether to next allow a read or write request for execution using the shared resource based in part on the information from write module 435. In response to a signal from configuration processor 410 to next allow a write request to be executed, write module 435 may provide a signal to answering token module 440 to issue an answering token for a corresponding application 215 to execute the allowed write request in write queue 230 using shared resource 130. Further, based on signals received from read/write switch 420 and/or block/unblock module 425, write module 430 may be configured to block write queue 230 such that no write requests are allowed to be executed until another signal from read/write switch 420 and/or block/unblock module 425 is received to unblock write queue 230.

Configuration processor 410 may be configured to receive or obtain a specific configuration file (e.g., a count-based file or a time-based file) including a configuration parameter (e.g., parameter N) relating to a relationship between the read and write requests. Based on the received configuration file, information from read module 425 and write module 430 and timing information from timer 415, configuration processor 410 may determine whether to allow a read request in read queue 225 or a write request in write queue 230 to be executed using shared resource 130. After determining whether to allow a read or write request, configuration processor 410 may send an appropriate signal to either read module 430 or write module 435 to allow the next read or write request in their respective queue to be executed using shared resource 130. Further, as discussed above, configuration processor 410 may receive information related to already executed read and write requests as well as read and write requests waiting in queue from read module 430 and write module 435, respectively. Based on this received information and the relationship of read and write requests (e.g., a ratio of read to write requests, etc.) as provided in the configuration file, configuration processor 410 may send a signal to read/write switch 420 to generate a switch signal indicating switching of allowing execution of read requests to write requests or vice-versa. Read/write switch 420 may send the switch signal directly, or indirectly via block/unblock module 425, to read module 430 and write module 435 such that, as appropriate read queue 225 and write queue 230 may be blocked and unblocked, respectively.

In some implementations, the configuration parameter N in the configuration file indicates a count of read requests to be executed before a write request is executed, or a count of write requests to be executed before a read request is executed. In other implementations, the configuration parameter N in the configuration file indicates a time period during which only read requests are executed and write requests are blocked, or a time period during which only write requests are executed and read requests are blocked. In accordance with signal(s) (generated based at least in part on parameter value N) received from read module 430 and write module 435, answering token module 440 may be configured to provide a set of access tokens to one or more concurrent applications or processes, where each access token allows one read or write request to be executed using shared resource 130. Return token module 445 configured to receive, upon completion of the execution of the allowed read or write request (i.e., the request for which the answering token was issued), a return token on return token queue 240 (that is different from read queue 225 and write queue 230) corresponding to the allowed read or write request.

Figure 5:
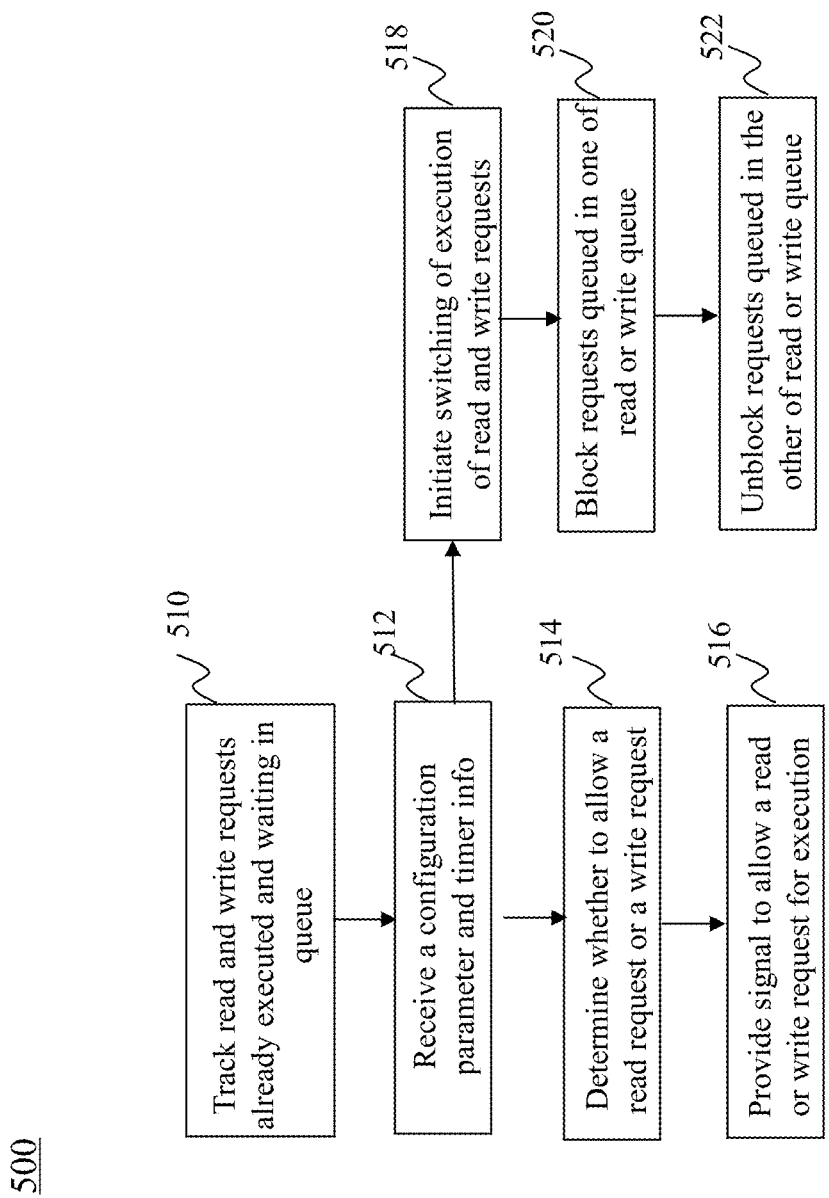
FIG. 5 is a flowchart of an exemplary process operated at resource access manager, in accordance with various embodiments of the present disclosure.

FIG. 5 is a flowchart of an exemplary process 500 operated at resource access manager 140, e.g., based on functionalities of various components of resource access manager 140 discussed above. In some implementations, at 510, using read module 430 and write module 435, read and write requests that have been already executed and that are still waiting in their respective queues are tracked. At 512, a configuration parameter and timer information is received at configuration processor 410. At 514, based on tracked information, configuration parameter and timer information, configuration processor 410 determines whether to allow a read request in read queue 225 or a write request in write queue 230 to be executed. At 516, configuration processor 410 sends an appropriate signal to either read module 430 or write module 435 to allow the next read or write request in their respective queue to be executed using shared resource 130. At 518, configuration processor 410, based on tracked information, configuration parameter and timer information, initiates switching of execution of read and write requests and sends a signal to read/write switch 420 to generate a switch signal indicating the switching. At 520 and 522, read/write switch 420 may send the switch signal directly, or indirectly via block/unblock module 425, to read module 430 and write module 435 such that, as appropriate read queue 225 and write queue 230 may be blocked and unblocked, respectively.

Figure 6:
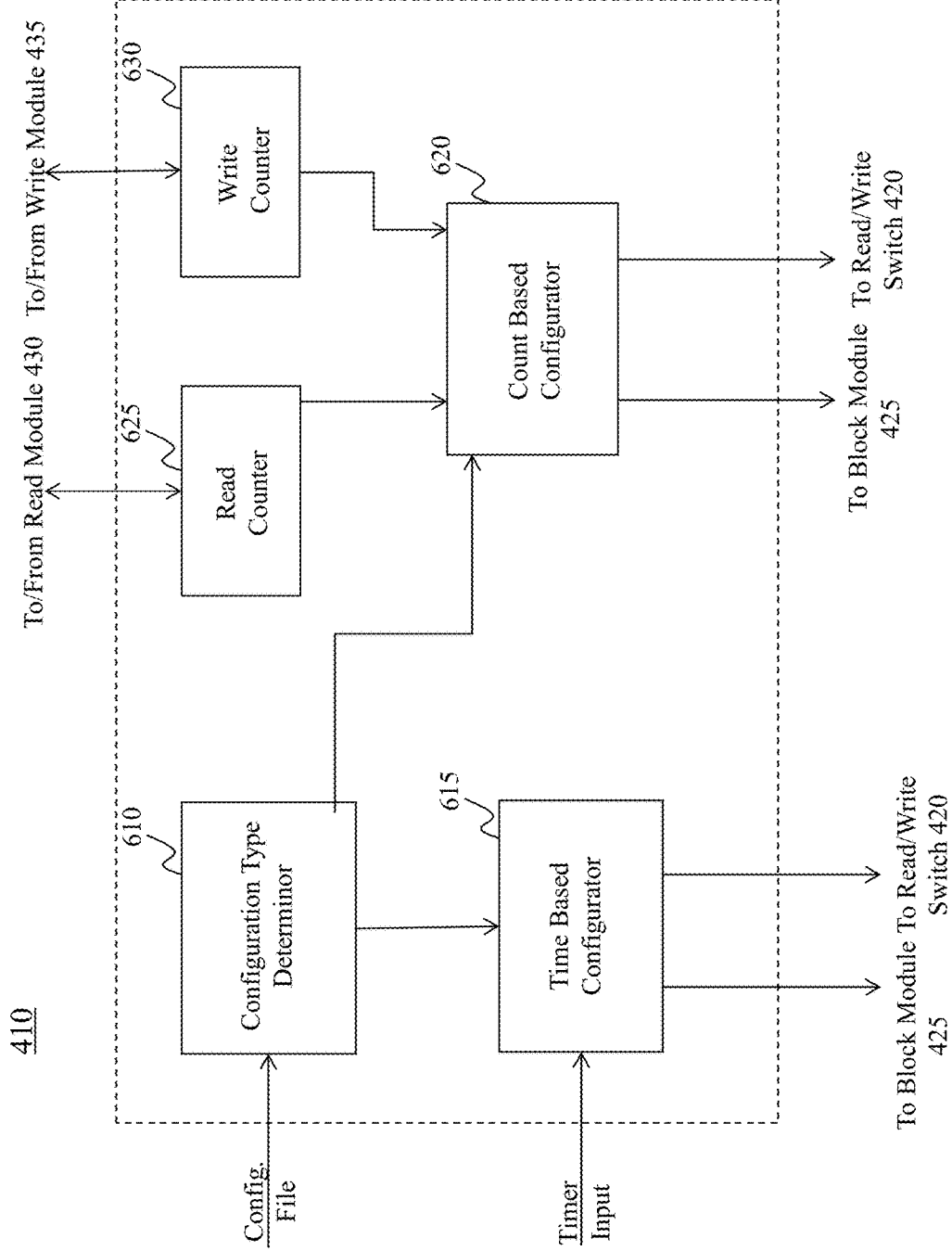
FIG. 6 illustrates a high level depiction of an exemplary configuration processor, in accordance with various embodiments of the present disclosure.

FIG. 6 illustrates a high level depiction of an exemplary configuration processor 410, according to an embodiment of the present disclosure. As shown, configuration processor 410 may include a configuration type determiner 610, a time-based configurator 615, a count-based configurator 620, a read counter 625, and a write counter 630.

In some embodiments, configuration type determiner 610 may receive a configuration file from configuration database 245 and parse and process the configuration file to determine whether it is a time-based configuration file, a count-based configuration file, or another type of configuration file with configuration parameter(s) other than a time period-related parameter or a count-related parameter. A time-based configuration file may define a specific time period, say N seconds (where N, an integer, is the configuration parameter), during which only read requests are executed and write requests are blocked, or a specific time period of N seconds during which only write requests are executed and read requests are blocked. A count-based configuration file may define that a specific count, say N (where N, an integer, is the configuration parameter), of read requests are to be executed before a write request is executed, or a specific count N of write requests to be executed before a read request is executed. If configuration type determiner 610 determines that the configuration file is a time-based configuration file, configuration type determiner 610 will send the configuration file and the related time configuration parameter N to time-based configurator 615. Further, if configuration type determiner 610 determines that the configuration file is a count-based configuration file, configuration type determiner 610 will send the configuration file and the related count configuration parameter N to count-based configurator 620.

In some implementations, read counter 625 may receive a signal from read module 430 indicating that return token module 445 has received a return token corresponding to a read request the execution of which is completed. Based on this signal, read counter 625 may increment a return token count for read requests that have been executed. Similarly, write counter 630 may receive a signal from write module 435 indicating that return token module 445 has received a return token corresponding to a write request the execution of which is completed. Based on this signal, write counter 630 may increment a return token count for write requests that have been executed. Both read counter 625 and write counter 630 may provide their respective return token counts to count-based configurator 620 continuously (i.e., as the counts are updated) and/or when requested by count-based configurator 620.

In one example, where the count-based configuration file defines a count N of read requests are to be executed before a write request is executed, count-based configurator 620 is configured to determine whether the return token count from read counter 625 is equal to the count N. Responsive to a determination that the return token count is equal to the count N, count-based configurator 620 may generate and send a reset signal to read counter 625 to reset the return token counter therein. Further, count-based configurator 620 may provide signals to switch 420 and block module 425. As discussed above, switch 420 and/or block module 425 may configure read module 430 to block read queue 225 such that no more read requests are executed, and provide another signal to write module 435 to provide at least one access token to a concurrent application or process 215 such that at least one write request in write queue 230 is executed using shared resource 130.

In another example, where the count-based configuration file defines a count N of write requests are to be executed before a read request is executed, count-based configurator 620 is configured to determine whether the return token count from write counter 630 is equal to the count N. Responsive to a determination that the return token count is equal to the count N, count-based configurator 620 may generate and send a reset signal to write counter 630 to reset the return token counter therein. Further, count-based configurator 620 may provide signals to switch 420 and block module 425. As discussed above, switch 420 and/or block module 425 may configure write module 435 to block write queue 230 such that no more write requests are executed, and provide another signal to read module 430 to provide at least one access token to a concurrent application or process 215 such that at least one read request in read queue 225 is executed using shared resource 130.

In one example, where the time-based configuration file defines a time period of N seconds during which only read requests are executed and write requests are blocked, timer 415 may start recording time elapsed since a first read request is executed. In this example, time-based configurator 615 may receive the information regarding the elapsed time from timer 415 and determine whether the elapsed time is equal to or greater than (exceeded) the time period of N seconds. In response to a determination that the elapsed time is equal to or greater than N seconds, time-based configurator 615 may generate and send a reset signal to timer 415 to reset the elapsed time counter. Further, time-based configurator 615 may provide signals to switch 420 and block module 425. As discussed above, switch 420 and/or block module 425 may configure read module 430 to block read queue 225 such that no more read requests are executed and provide another signal to write module 435 to provide at least one access token to a concurrent application or process 215 such that at least one write request in write queue 230 is executed using shared resource 130.

In another example, where the time-based configuration file defines a time period of N seconds during which only write requests are executed and read requests are blocked, timer 415 may start recording time elapsed since a first write request is executed. In this example, time-based configurator 615 may receive the information regarding the elapsed time from timer 415 and determine whether the elapsed time is equal to or greater than (exceeded) the time period of N seconds. In response to a determination that the elapsed time is equal to or greater than N seconds, time-based configurator 615 may generate and send a reset signal to timer 415 to reset the elapsed time counter. Further, time-based configurator 615 may provide signals to switch 420 and block module 425. As discussed above, switch 420 and/or block module 425 may configure write module 435 to block write queue 230 such that no more write requests are executed and provide another signal to read module 430 to provide at least one access token to a concurrent application or process 215 such that at least one read request in read queue 225 is executed using shared resource 130. In some embodiments, time-based configurator 615, count-based configurator 620, switch 420 and block module 425 may be implemented as a single "switch and block module."

In the above example, the reset signals are sent to reset the respective read/write counters or the time counter only after the count or elapsed time has met the corresponding configuration parameter N, after all of the allowed read/write requests have been completed and after all of the return tokens have been successfully received from the corresponding applications. In some cases, reset signals are generated and sent while the allowed read/write requests are still active once it is determined that those active requests are zombie or dead processes.

In some cases, the system may have only a few and/or infrequent read or write requests. In such cases, regardless of whether the (count-based or time-based) configuration parameter N has been satisfied, configuration processor 410 may allow a less favored read or write request for execution, if there are currently none of the more favored write or read requests in the queue. For example, if according to the configuration parameter N, configuration processor 410 is to allow a read request next for execution but no read request is presently waiting in the queue, configuration processor 410 may not preclude a write request and in fact may allow a write request waiting in the write queue for execution.

Figure 7A:
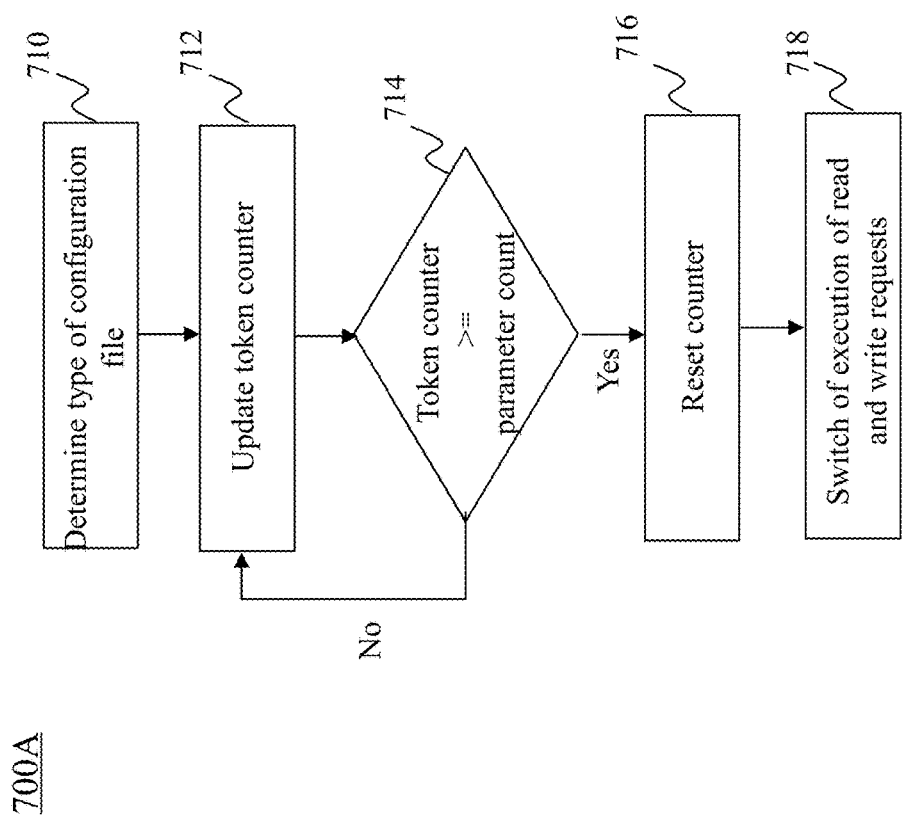
FIGS. 7A, 7B are flowcharts of exemplary processes operated at configuration processor, in accordance with various embodiments of the present disclosure.

FIG. 7A is a flowchart of an exemplary process 700A operated at configuration processor 410, e.g., based on functionalities of various components of configuration process 410 discussed above. In some implementations, at 710, configuration type determiner 610 receives a configuration file and parses and processes the configuration file to determine whether it is a time-based configuration file, a count-based configuration file, or another type of configuration file. At 712, read counter 625 or write counter 630 receives a signal indicating that return token module 445 has received a return token corresponding to an executed read or write request. Based on this signal, read counter 625 or write counter 630 increments a return token count for read or write requests, respectively, that have been executed. At 714, a determination is made as to whether the return token count is equal to or greater than the count N provided in the configuration file. If yes, at 716, count-based configurator 620 generates and sends a reset signal to reset the return token count. If no, the process returns to 712 to continue updating (e.g., incrementing) the return token counter for read and write requests. At 718, configurator 620 provides signals to switch execution of read and write requests (e.g., as discussed with respect to operations 520, 522).

Figure 7B:
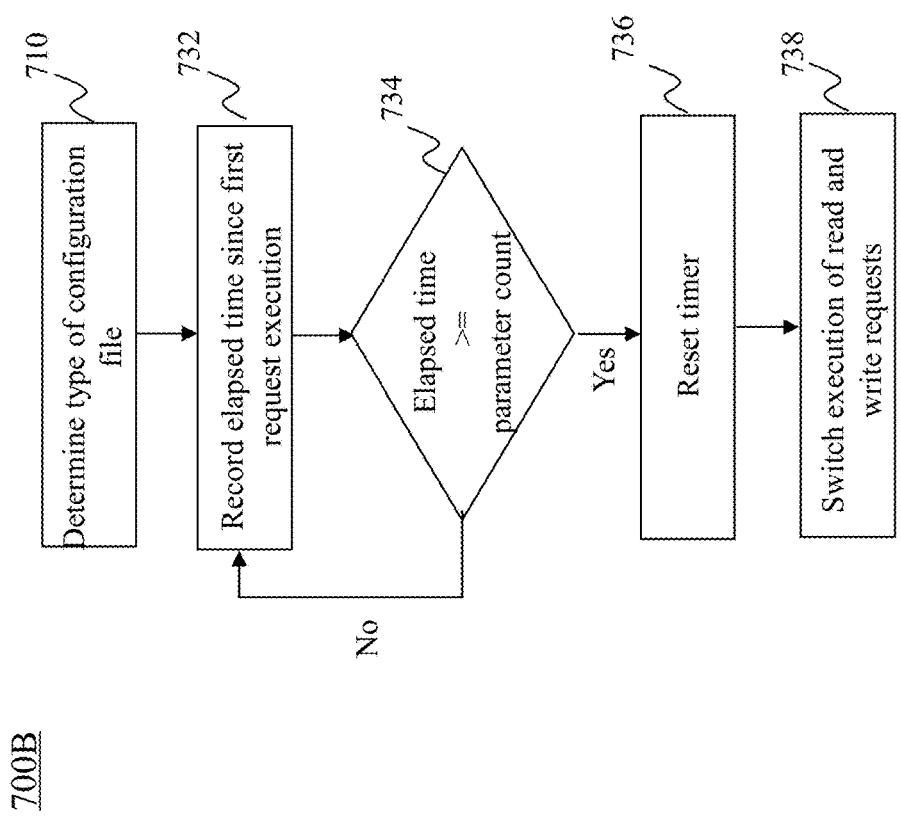

FIG. 7B is a flowchart of an exemplary process 700B operated at configuration processor 410, e.g., based on functionalities of various components of configuration process 410 discussed above. In some implementations, at 710, configuration type determiner 610 receives a configuration file and parses and processes the configuration file to determine whether it is a time-based configuration file, a count-based configuration file, or another type of configuration file. At 732, timer 415 starts recording time since first request starts executing. At 734, a determination is made as to whether the elapsed time is equal to or greater than the time period N provided in the configuration file. If yes, at 736, time-based configurator 615 generates and sends a reset signal to reset the return token count. If no, the process returns to 732 to continue recording elapsed time as the read/write requests are being executed. At 738, configurator 615 provides signals to switch execution of read and write requests (e.g., as discussed with respect to operations 520, 522).

Figure 8:
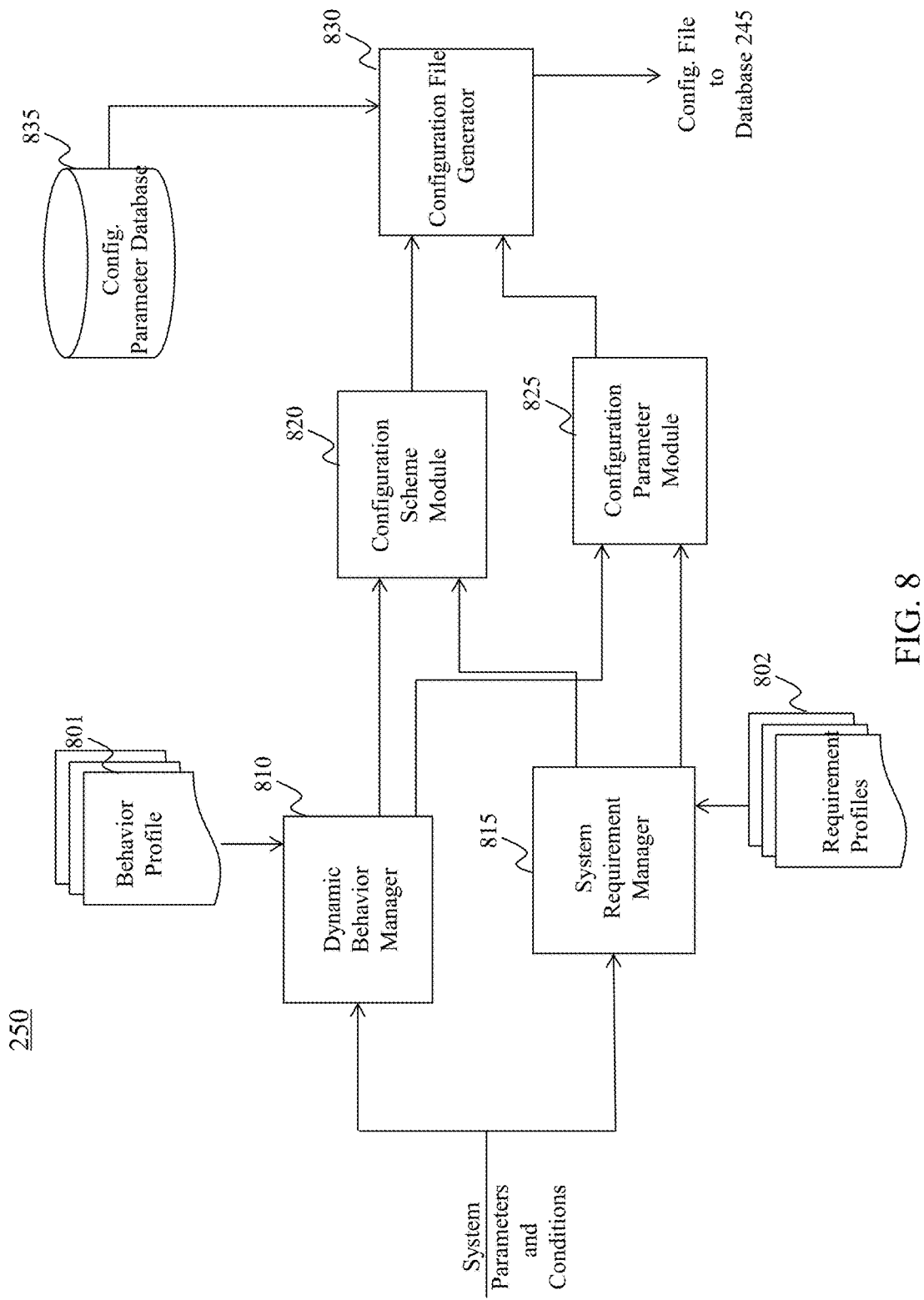
FIG. 8 illustrates a high level depiction of an exemplary access requirement manager, in accordance with various embodiments of the present disclosure.

FIG. 8 illustrates a high level depiction of an exemplary access requirement manager 250, according to an embodiment of the present disclosure. As shown, access requirement manager 250 may include a dynamic behavior manager 810, a system requirement manager 815, a configuration scheme module 820, a configuration parameter module 825, a configuration file generator 830 and a configuration database 835. Dynamic behavior manager 810 may receive and process current conditions of system 100 or 200 from applications 215 via processor 210 and/or from other components of the system. Such current system conditions may indicate whether the concurrently running applications or processes in the system need to execute more read requests than write requests, or vice-versa, using shared resource 130. Based on such dynamic information about read and write requests, dynamic behavior manager 810 may determine whether to generate a new configuration scheme to access and use shared resource 130, and/or whether to update the value of the configuration parameter in an existing configuration scheme in an existing configuration file. Dynamic behavior manager 810 may also choose a specific type (e.g., time-based or count-based) of configuration scheme for a new configuration scheme. Dynamic behavior manager 810 may utilize behavior profiles 801 (stored in a database) to make the determinations regarding generating or updating a configuration file, and output the result of the determinations to configuration scheme module 820 and configuration parameter module 825.

In some implementations, system requirement manager 815 may receive and process specific requirements, e.g., pre-established requirements, of system 100 or 200 with regard to concurrent applications 215 and/or other components or processes of the system. Such system requirements may indicate whether, at a particular time or day, the concurrently running applications or processes in the system need to execute updates on shared resource 130 such that more write requests than read requests are required to be executed using shared resource 130. Based on such requirement information about read and write requests, system requirement manager 815 may determine whether to generate a new configuration scheme to access and use shared resource 130, and/or whether to update the value of the configuration parameter in an existing configuration scheme in an existing configuration file. System requirement manager 815 may also choose a specific type (e.g., time-based or count-based) of configuration scheme for a new configuration scheme. System requirement manager 815 may utilize system requirement profiles 802 (stored in a database) to make the determinations regarding generating or updating a configuration file, and output the result of the determinations to configuration scheme module 820 and configuration parameter module 825.

Based on the inputs received from dynamic behavior manager 810 and/or system requirement manager 815, configuration scheme module 820 may generate a new scheme such that current system conditions and/or predetermined system requirements to access and use shared resource 130 are met. For example, the new scheme may be count-based defining that a specific count, say N (where N is an integer), of read requests are to be executed before a write request is executed, or a specific count N of write requests to be executed before a read request is executed. In another example, the new scheme may be time-based defining a specific time period, say N seconds (where N is an integer), during which only read requests are executed and write requests are blocked, or a specific time period of N seconds during which only write requests are executed and read requests are blocked. Configuration scheme module 820 may also generate a new scheme defining if and when a high priority queue may be established to handle read and/or write requests from one or more specific applications 215. Configuration scheme module 820 may then output the newly generated scheme to configuration file generator 830, which may generate a configuration file, including the new configuration scheme and one or more appropriate configuration parameters (e.g., parameter N) from database 835, in a format that is required and understood by resource access manager 140. Configuration file generator 830 may store the new configuration file in configuration database 245.

Further, if the determinations from dynamic behavior manager 810 and/or system requirement manager 815 indicate that a configuration parameter (e.g., count N or time period N) is to be updated in an existing configuration file, configuration parameter module 825 may send to configuration file generator 830 information identifying the configuration file that is to be updated and new parameter value with which to update the configuration file. Configuration file generator 830 may retrieve the identified configuration file from configuration database 245, update the value N of the configuration parameter, and send the updated configuration file to configuration database 245 for storage.

Figure 9:
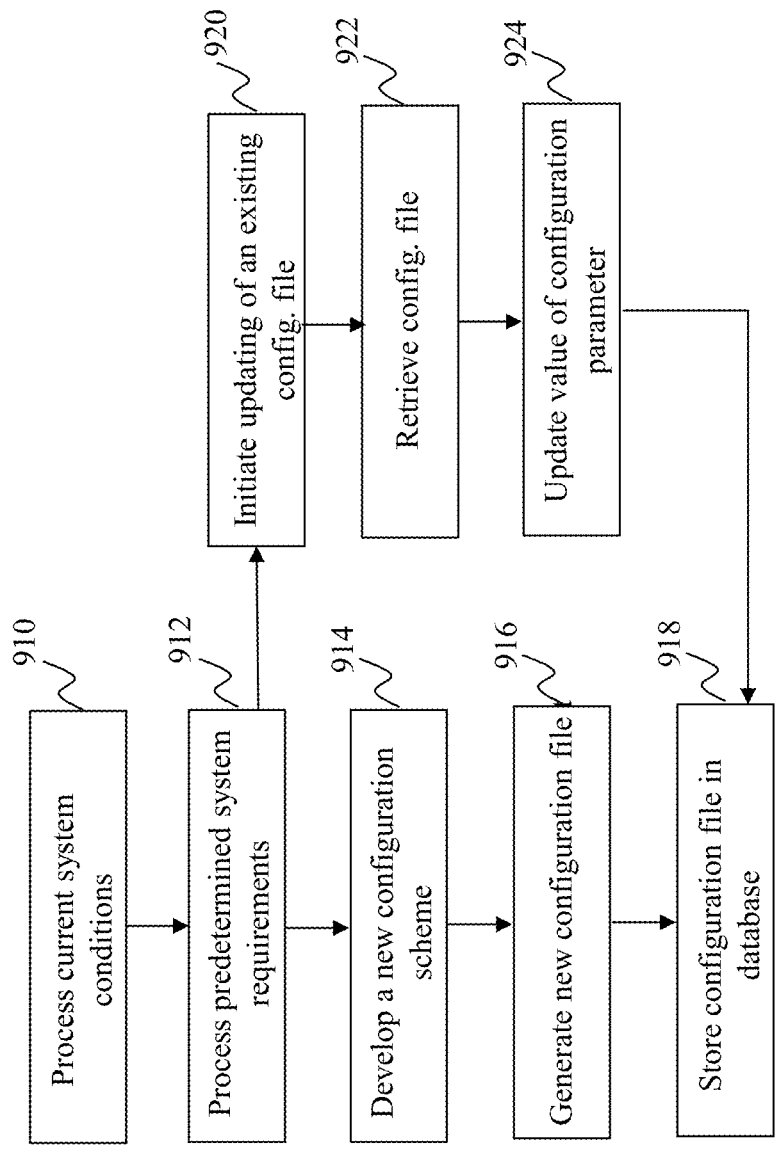
FIG. 9 is a flowchart of an exemplary process operated at access requirement manager, in accordance with various embodiments of the present disclosure.

FIG. 9 is a flowchart of an exemplary process 900 operated at access requirement manager 250, e.g., based on functionalities of various components of access requirement manager 250 discussed above. In some implementations, at 910, dynamic behavior manager 810 receives and processes current conditions of system 100 or 200 obtained from applications 215. At 912, system requirement manager 815 receives and processes specific requirements, e.g., pre-established requirements, of system 100 or 200 with regard to concurrent applications 215 and/or other components or processes of the system. At 914, dynamic behavior manager 810 chooses a specific type of configuration scheme for a new configuration scheme and a new scheme of the selected type is developed by configuration scheme module 820. At 916, based on the new configuration scheme, a new configuration file is generated by configuration file generator 830, and sent for storage in database 245, at 918. At 920, process to update an existing configuration file is initiated and the existing configuration file is retrieved for updating the configuration parameter at 922. At 924, configuration file generator 830 update the value N of the configuration parameter, and at 918, send the updated configuration file to configuration database 245 for storage.

Figure 10:
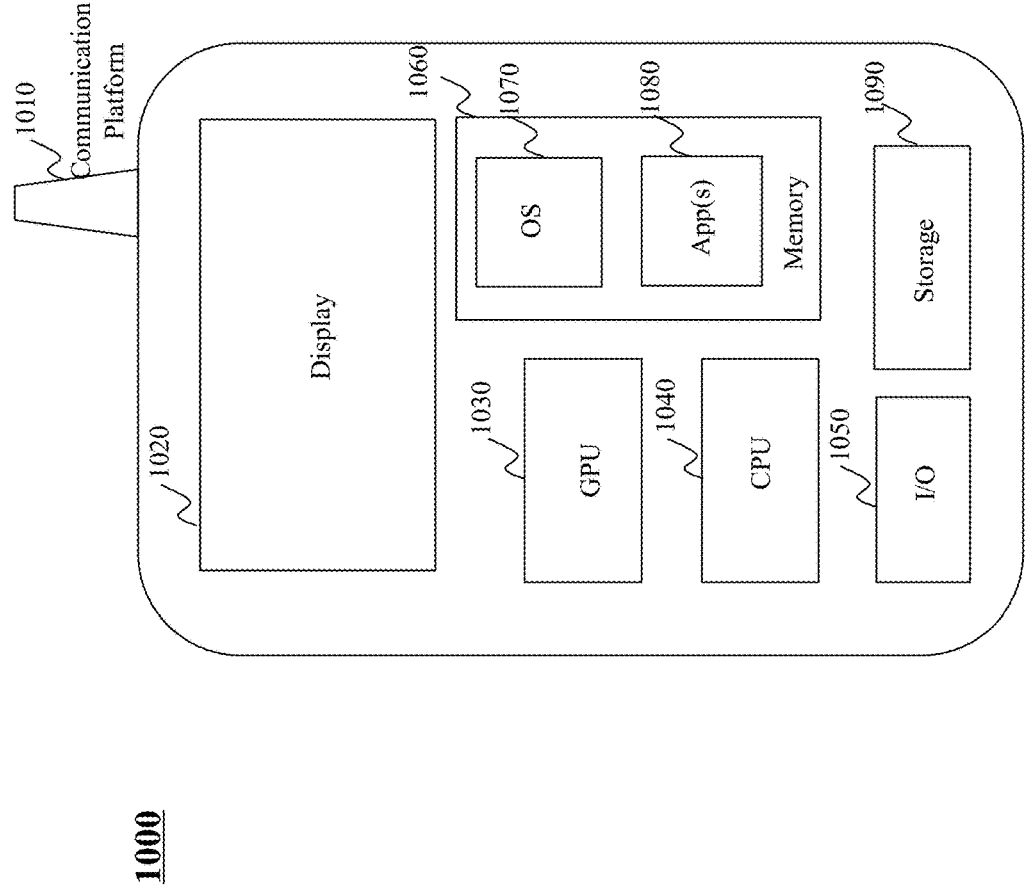
FIG. 10 depicts the architecture of a mobile device which can be used to implement a specialized system incorporating teachings of the present disclosure.

FIG. 10 depicts the architecture of a mobile device which can be used to realize a specialized system implementing the present teaching. In this example, the user device is a mobile device 1000, including, but is not limited to, a smartphone, a tablet, a music player, a handled gaming console, a global positioning system (GPS) receiver, and a wearable computing device (e.g., eyeglasses, wrist watch, etc.), or in any other form factor. The mobile device 1000 in this example includes one or more central processing units (CPUs) 1002, one or more graphic processing units (GPUs) 1004, a display 1006, a memory 1008, a communication platform 1010, such as a wireless communication module, storage 1012, and one or more input/output (I/O) devices 1014. Any other suitable component, including but not limited to a system bus or a controller (not shown), may also be included in the mobile device 1000. As shown in FIG. 10, a mobile operating system 1016, e.g., iOS, Android, Windows Phone, etc., and one or more applications 1018 may be loaded into the memory 1008 from the storage 1012 in order to be executed by the CPU 1002. The applications 1018 may include a browser or any other suitable mobile apps for receiving and rendering content streams and advertisements on the mobile device 1000.

To implement various modules, units, and their functionalities described in the present disclosure, computer hardware platforms may be used as the hardware platform(s) for one or more of the elements described above. The hardware elements, operating systems and programming languages of such computers are conventional in nature, and it is presumed that those skilled in the art are adequately familiar therewith to adapt those technologies to infer user identity across different applications and devices, and create and update a user profile based on such inference. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 11:
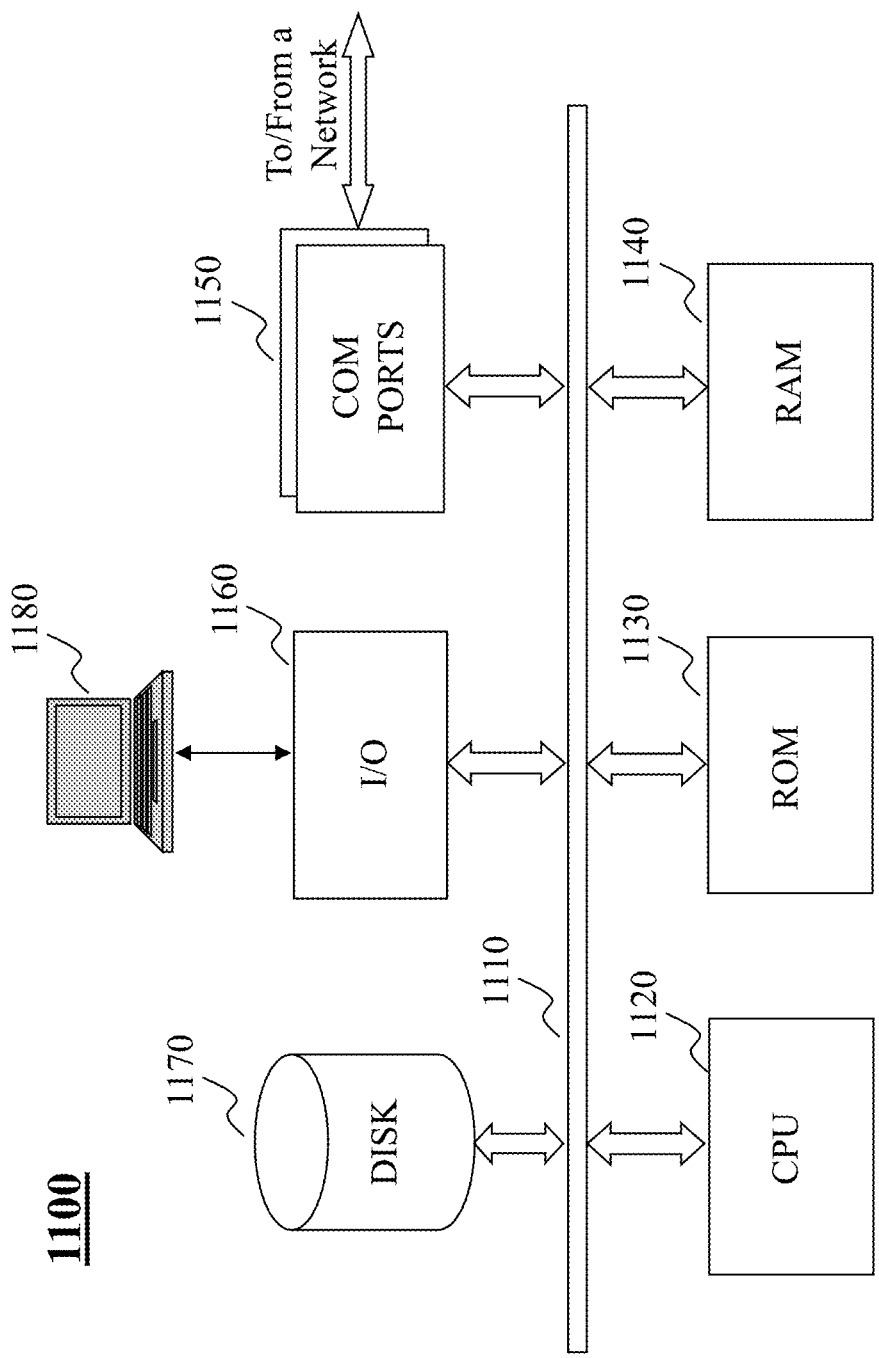
FIG. 11 depicts the architecture of a computer which can be used to implement a specialized system incorporating teachings of the present disclosure.

FIG. 11 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1100 may be used to implement resource access manager 140, access requirement manager 250 and/or other components of the disclosed systems, via its hardware, software program, firmware, or a combination thereof. Although only one such computer is shown, for convenience, the computer functions relating to managing access to a shared resource as described herein may be implemented in a distributed fashion on a number of similar platforms, to distribute the processing load.

The computer 1100, for example, includes COM ports (or one or more communication platforms) 1150 connected to and from a network connected thereto to facilitate data communications. Computer 1100 also includes a central processing unit (CPU) 1120, in the form of one or more processors, for executing program instructions. The exemplary computer platform includes an internal communication bus 1110, program storage and data storage of different forms, e.g., disk 1170, read only memory (ROM) 1130, or random access memory (RAM) 1140, for various data files to be processed and/or communicated by the computer, as well as possibly program instructions to be executed by the CPU. Computer 1100 also includes an I/O component 1160, supporting input/output flows between the computer and other components therein such as user interface elements 1180. Computer 1100 may also receive programming and data via network communications.

Hence, aspects of the methods of managing or controlling access to a shared resource, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other user profile and app management server into the hardware platform(s) of a computing environment or other system implementing a computing environment or similar functionalities in connection with access control techniques for shared resources. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method of controlling access to a shared resource comprising a memory unit, the method comprising:
   receiving, at a processor, a configuration parameter relating to a relationship between read and write requests, initiated by concurrent processes and stored in a read queue and a write queue, respectively, for accessing the shared resource, wherein both the read and write queues are associated with the shared resource, wherein the configuration parameter indicates one of a count of read requests to be executed before a write request is executed and a count of write requests to be executed before a read request is executed;
   determining, by the processor based on the configuration parameter, whether to allow a read request or a write request to be executed using the shared resource;
   providing, by the processor in response to the determining, to a concurrent process access to the shared resource for executing the allowed read or write request; and
   receiving, at the processor upon a completion of executing the allowed read or write request, a return token on a return token queue that is different from the read and write queues, the return token corresponding to the allowed read or write request.

2. The method of claim 1, further comprising:
   providing a first set of access tokens to one or more concurrent processes based on the count, each access token allows one read request in the read queue to be executed using the shared resource;
   receiving a return token corresponding to each read request upon completion of the execution of the read request;
   incrementing a return token counter upon receiving each return token;
   determining whether the return token counter is equal to the count; and
   responsive to a determination that the return token counter is equal to the count,
     resetting the return token counter,
     providing a signal to block the read queue such that no more read requests are executed, and
     providing at least one second access token to a concurrent process to allow at least one write request in the write queue to be executed using the shared resource.

3. The method of claim 1, wherein the configuration parameter indicates a time period during which only read requests are executed and write requests are blocked, or a time period during which only write requests are executed and read requests are blocked.

4. The method of claim 3, further comprising:
   providing a first set of access tokens to one or more concurrent processes based on the time period, each access token allows one read request in the read queue to be executed using the shared resource;
   initiating a timer to start recording time elapsed since a first read request is executed based on an access token;
   determining whether the elapsed time recorded by the timer is equal to or greater than the time period; and responsive to a determination that the elapsed time is equal to or greater than the time period the time period, resetting the timer,
providing a signal to block the read queue such that no more read requests are executed, and
providing at least one second access token to a concurrent process to allow at least one write request in the write queue to be executed using the shared resource.

5. The method of claim 1, wherein the configuration parameter indicates a number of read requests or write requests that are simultaneously executed by concurrently accessing different portions of the shared resource.

6. The method of claim 1, wherein the configuration parameter is updated based on certain conditions related to the concurrent processes.

7. A system for controlling access to a shared resource, the system comprising:
a processing unit configured to support concurrent processes executing concurrently in the system;
a shared resource comprising a memory unit, the shared resource is used to execute read and write requests initiated by the concurrent processes and stored in a read queue and a write queue, respectively, for accessing the shared resource;
a configuration processor configured to:
receive a configuration parameter relating to a relationship between the read and write requests, the configuration parameter indicating one of a count of read requests to be executed before a write request is executed and a count of write requests to be executed before a read request is executed and
determine, based on the configuration parameter, whether to allow a read request or a write request to be executed using the shared resource;
a read module configured to provide, in response to said determining by the configuration processor, access to the shared resource by a concurrent process to execute an allowed read request;
a write module configured to provide, in response to said determining by the configuration processor, access to the shared resource by a concurrent process to execute an allowed write request; and
a return token module configured to receive, upon completion of the execution of the allowed read or write request, a return token on a return token queue that is different from the read and write queues, the return token corresponding to the allowed read or write request.

8. The system of claim 7, further comprising:
an answering token module configured to provide a first set of access tokens to one or more concurrent processes based on the count, each access token allows one read request in the read queue to be executed using the shared resource;
a return token counter configured to receive an indication from the return token module about receipt of a return token corresponding to each read request of which the execution is completed, and based on the indication, increment a return token count; and
a switch and block module configured to:
determine whether the return token count is equal to the count, and
responsive to a determination that the return token count is equal to the count:
reset the return token counter,
provide a signal to the read module to block the read queue such that no more read requests are executed, and
provide another signal to the write module to provide at least one second access token to a concurrent process such that at least one write request in the write queue is executed using the shared resource.

9. The system of claim 7, wherein the configuration parameter indicates a time period during which only read requests are executed and write requests are blocked, or a time period during which only write requests are executed and read requests are blocked.

10. The system of claim 9, further comprising:
an answering token module configured to provide a first set of access tokens to one or more concurrent processes based on the time period, each access token allows one read request in the read queue to be executed using the shared resource;
a timer configured to start recording time elapsed since a first read request is executed based on an access token; and
a switch and block module configured to:
determine whether the elapsed time recorded by the timer is equal to or greater than the time period, and
responsive to a determination that the elapsed time equal to or greater than the time period:
reset the timer,
provide a signal to block the read queue such that no more read requests are executed, and
provide at least one second access token to one or more concurrent processes to allow at least one write request in the write queue to be executed using the shared resource.

11. The system of claim 7, wherein the configuration parameter indicates a number of read requests or write requests that are simultaneously executed by concurrently accessing different portions of the shared resource.

12. The system of claim 7, wherein the configuration parameter is updated based on certain conditions related to the concurrent processes.

13. A machine readable, tangible, and non-transitory medium having information recorded thereon for controlling access to a shared resource comprising a memory unit, where the information, when read by the machine, causes the machine to perform at least the following:
receiving, at a processor, a configuration parameter relating to a relationship between read and write requests, initiated by concurrent processes and stored in a read queue and a write queue, respectively, for accessing the shared resource, wherein both the read and write queues are associated with the shared resource, wherein the configuration parameter indicates one of a count of read requests to be executed before a write request is executed and a count of write requests to be executed before a read request is executed;
determining, by the processor based on the configuration parameter, whether to allow a read request or a write request to be executed using the shared resource;
providing, by the processor in response to the determining, to a concurrent process access to the shared resource for executing the allowed read or write request; and
receiving, at the processor upon a completion of executing the allowed read or write request, a return token on a return token queue that is different from the read and write queues, the return token corresponding to the allowed read or write request.

14. The medium of claim 13, where the information, when read by the machine, further causes the machine to perform at least the following:
provariing a first set of access tokens to one or more concurrent processes based on the count, each access token allows one read request in the read queue to be executed using the shared resource;
receiving a return token corresponding to each read request upon completion of the execution of the read request;
incrementing a return token counter upon receiving each return token;
determining whether the return token counter is equal to the count; and
responsive to a determination that the return token counter is equal to the count,
resetting the return token counter,
providing a signal to block the read queue such that no more read requests are executed, and
providing at least one second access token to a concurrent process to allow at least one write request in the write queue to be executed using the shared resource.

15. The medium of claim 13, wherein the configuration parameter indicates a time period during which only read requests are executed and write requests are blocked, or a time period during which only write requests are executed and read requests are blocked.

16. The medium of claim 15, where the information, when read by the machine, further causes the machine to perform at least the following:
providing a first set of access tokens to one or more concurrent processes based on the time period, each access token allows one read request in the read queue to be executed using the shared resource;
initiating a timer to start recording time elapsed since a first read request is executed based on an access token;
determining whether the elapsed time recorded by the timer is equal to or greater than the time period; and
responsive to a determination that the elapsed time is equal to or greater than the time period the time period, resetting the timer,
providing a signal to block the read queue such that no more read requests are executed, and
providing at least one second access token to a concurrent process to allow at least one write request in the write queue to be executed using the shared resource.

17. The medium of claim 13, wherein the configuration parameter indicates a number of read requests or write requests that are simultaneously executed by concurrently accessing different portions of the shared resource.

18. The medium of claim 13, wherein the configuration parameter is updated based on certain conditions related to the concurrent processes.

* * * * *